(12) United States Patent
Lamb et al.

(10) Patent No.: US 9,967,110 B2
(45) Date of Patent: May 8, 2018

(54) METHOD AND APPARATUS FOR REGISTERING REMOTE NETWORK DEVICES WITH A CONTROL DEVICE

(71) Applicant: Ecolink Intelligent Technology, Inc., Carlsbad, CA (US)

(72) Inventors: Michael Lamb, Rancho Santa Fe, CA (US); Brandon Gruber, Vista, CA (US)

(73) Assignee: Ecolink Intelligent Technology, Inc., Carlsbad, CA (US)

( * ) Notice: Subject to any disclaimer, the term of this patent is extended or adjusted under 35 U.S.C. 154(b) by 0 days. days.

(21) Appl. No.: 15/231,224

(22) Filed: Aug. 8, 2016

(65) Prior Publication Data

US 2016/0352532 A1  Dec. 1, 2016

Related U.S. Application Data

(63) Continuation of application No. 14/734,932, filed on Jun. 9, 2015, now Pat. No. 9,438,443, and a continuation of application No. 13/401,687, filed on Feb. 21, 2012, now Pat. No. 9,054,892.

(51) Int. Cl.
*H04L 12/28* (2006.01)
*H04L 12/46* (2006.01)

(52) U.S. Cl.
CPC ........ *H04L 12/2836* (2013.01); *H04L 12/462* (2013.01)

(58) Field of Classification Search
CPC ..... H04L 67/125; H04L 12/46; H04L 12/462; H04L 12/4625; H04L 12/66; H04L 2012/5618; H04L 12/56; H04L 29/06095; H04L 49/3009; H04L 49/309; H04W 60/00; H04W 8/02; H04W 8/26
USPC ................................................ 370/401, 392
See application file for complete search history.

(56) References Cited

U.S. PATENT DOCUMENTS

| | | | | |
|---|---|---|---|---|
| 7,062,270 | B1 * | 6/2006 | Dalvie | H04W 8/12 455/432.1 |
| 7,146,414 | B1 * | 12/2006 | Sievert | H04L 67/125 709/223 |
| 7,243,151 | B2 * | 7/2007 | Sekiguchi | H04L 12/10 370/401 |

(Continued)

*Primary Examiner* — Wutchung Chu
(74) *Attorney, Agent, or Firm* — Greenberg Traurig, LLP

(57) ABSTRACT

A method and apparatus for registering a remote network device with a control device is disclosed. In one embodiment, a registration information message is received by a bridge device from an unregistered remote network device using a first communication protocol. Identification information within the registration information message is stored in a record in a memory. A second registration information message is transmitted to the control device using the second communication protocol, the second registration information message comprising at least some of the identification information. In response, an acknowledgement message is received from the control device, the acknowledgement message comprising an identification code. When subsequent messages are received from the remote network device, the bridge associates these messages with the identification code, then re-transmits the messages to the control device using the identification code.

8 Claims, 8 Drawing Sheets

(56) References Cited

U.S. PATENT DOCUMENTS

| | | | |
|---|---|---|---|
| 8,824,487 B1* | 9/2014 | Ray | H04L 65/102 370/401 |
| 8,868,757 B1* | 10/2014 | Liu | H04L 63/0281 709/220 |
| 2002/0062365 A1* | 5/2002 | Nishikawa | G05B 19/042 709/223 |
| 2006/0022816 A1* | 2/2006 | Yukawa | G08B 25/006 340/521 |
| 2006/0168178 A1* | 7/2006 | Hwang | H04L 12/2803 709/223 |
| 2006/0190458 A1* | 8/2006 | Mishina | H04L 67/125 |
| 2006/0245403 A1* | 11/2006 | Kumar | H04L 12/2803 370/338 |
| 2006/0271661 A1* | 11/2006 | Qi | H04L 41/0823 709/223 |
| 2007/0060147 A1* | 3/2007 | Shin | H04W 4/18 455/445 |
| 2007/0081544 A1* | 4/2007 | Sakai | H04L 29/12047 370/401 |
| 2007/0162748 A1* | 7/2007 | Okayama | H04L 63/0428 713/165 |
| 2008/0062917 A1* | 3/2008 | Oguchi | H04L 67/14 370/328 |
| 2008/0136708 A1* | 6/2008 | Kim | H04W 52/16 342/367 |
| 2009/0296724 A1* | 12/2009 | Matsunaga | H04L 12/2818 370/401 |
| 2010/0039958 A1* | 2/2010 | Ge | H04L 12/2803 370/254 |
| 2011/0046798 A1* | 2/2011 | Imes | F24F 11/006 700/286 |
| 2012/0011230 A1* | 1/2012 | Moreman | H04L 61/2015 709/220 |
| 2012/0057581 A1* | 3/2012 | An | H04W 8/02 370/338 |
| 2012/0269182 A1* | 10/2012 | Walker | H04W 8/04 370/338 |
| 2012/0302217 A1* | 11/2012 | Sennett | H04W 4/22 455/414.1 |
| 2013/0086245 A1* | 4/2013 | Lu | H04L 12/2807 709/223 |
| 2013/0091279 A1* | 4/2013 | Haddad | H04L 12/2834 709/225 |
| 2013/0201316 A1* | 8/2013 | Binder | H04L 67/12 348/77 |
| 2014/0098700 A1* | 4/2014 | Maruhashi | H04L 12/403 370/252 |
| 2015/0280937 A1* | 10/2015 | Sadhu | H04L 12/2825 709/217 |
| 2017/0331899 A1* | 11/2017 | Binder | H04L 67/12 |
| 2017/0344044 A1* | 11/2017 | Imes | H04L 67/42 |

* cited by examiner

METHOD AND APPARATUS FOR REGISTERING REMOTE NETWORK DEVICES WITH A CONTROL DEVICE

CROSS-REFERENCE TO RELATED APPLICATION

This application is a continuation of U.S. patent application Ser. No. 14/734,932, filed Jun. 9, 2015, which application is a continuation of U.S. patent application Ser. No. 13/401,687, filed Feb. 21, 2012, now U.S. Pat. No. 9,054,892, the disclosures of which are incorporated herein by reference in their entirety.

BACKGROUND

The present application relates to the field of digital networks. More specifically, the present application relates methods and apparatus for allowing disparate network nodes to communicate with each other.

Home security systems have been around for years. Typically, these systems comprise a control unit in communication with one or more remote sensors, such as door/window sensors, motion detectors, tilt sensors, and so on. Communication between these devices may occur over one or more wired or wireless medium, or a combination of both, forming one or more digital networks.

A number of proprietary and open-source protocols exist that allow the various system components to communicate with one another. One such protocol that is popular today is known as the Z-wave protocol. The Z-wave protocol assigns one device as a "controller" and other devices as "slaves". The controller may send commands to the slaves, requesting information or instructing them to perform a function. The commands sent by the controller and information sent by the slaves are sent as data packets that are defined by the Z-wave protocol. RF transmission occurs at 908 MHz.

Generally, slave devices that operate using one protocol cannot communicate with a controller that uses a different protocol. This limitation may create problems for consumers who own controllers that use a particular communication protocol that wish to add a slave device that uses a different communications protocol. For example, a homeowner having a Z-wave-enabled controller may wish to add a driveway sensor to detect arrival and departures of vehicles to the homeowner's property. However, the driveway sensor is available using only the well-known Insteon protocol.

Thus, it would be desirable to be able to allow slave devices using one protocol to communicate with a controller that uses a different protocol.

SUMMARY

The embodiments described herein relate to methods and apparatus for registering a remote network device with a control device, wherein the remote network device communicates using a first communication protocol and the control device communicates using a second communication protocol.

In one embodiment, a method for registering a remote network device with a control device comprises receiving a registration information message by a bridge device from a remote network device using a first communication protocol, the registration information message comprising identification information relating to the remote network device. In response, a record is created within a memory, the record for storing at least some of the identification information. A second registration information message is then transmitted to the control device using the second communication protocol, the second registration information message comprising at least some of the identification information. In response, an acknowledgement message is received from the control device using the second communication protocol, the acknowledgement message comprising an identification code assigned by the control device, the identification code uniquely identifying the remote network device. The identification code is stored in the memory, and is associated with the identification information. Next, a subsequent message is received from the remote network device, and the bridge device determines whether the subsequent message has originated from a remote network device associated with the identification code. When the bridge determines that the subsequent message has originated from a remote network device associated with the identification code, it re-transmits the subsequent message to the control device, the retransmitted subsequent message comprising the identification code.

In another embodiment, an apparatus for registering a remote network device with a control device is described, wherein the remote network device communicates using a first communication protocol and the control device communicates using a second communication protocol, comprising a first transceiver for communicating with the remote network device using the first communication protocol, a second transceiver for communicating with the control device using the second communication protocol, a processor for executing processor-executable instructions, and a memory for storing the processor-executable instructions, the processor-executable instructions causing the apparatus to: receiving a registration information message by a bridge device from a remote network device using a first communication protocol, the registration information message comprising identification information relating to the remote network device. In response, a record is created within a memory, the record for storing at least some of the identification information. A second registration information message is then transmitted to the control device using the second communication protocol, the second registration information message comprising at least some of the identification information. In response, an acknowledgement message is received from the control device using the second communication protocol, the acknowledgement message comprising an identification code assigned by the control device, the identification code uniquely identifying the remote network device. The identification code is stored in the memory, and is associated with the identification information. Next, a subsequent message is received from the remote network device, comprising the identification information. In response, at least some of the identification information associated with the identification code is used to transmit the subsequent message to the remote network device using at least some of the identification information to address the remote network device. Next, a subsequent message is received from the remote network device, and the bridge device determines whether the subsequent message has originated from a remote network device associated with the identification code. When the bridge determines that the subsequent message has originated from a remote network device associated with the identification code, it re-transmits the subsequent message to the control device, the retransmitted subsequent message comprising the identification code.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

The present description relates to a bridge device for allowing communications between network nodes that use different communication protocols. In one embodiment, methods and apparatus are described that allow "slave" devices to register with a "control" device. In another embodiment, methods and apparatus are described that allow communications between such slave devices and the control device during normal operation. The concepts disclosed herein generally related to digital communication networks found in security systems and home automation control systems.

Figure 1:
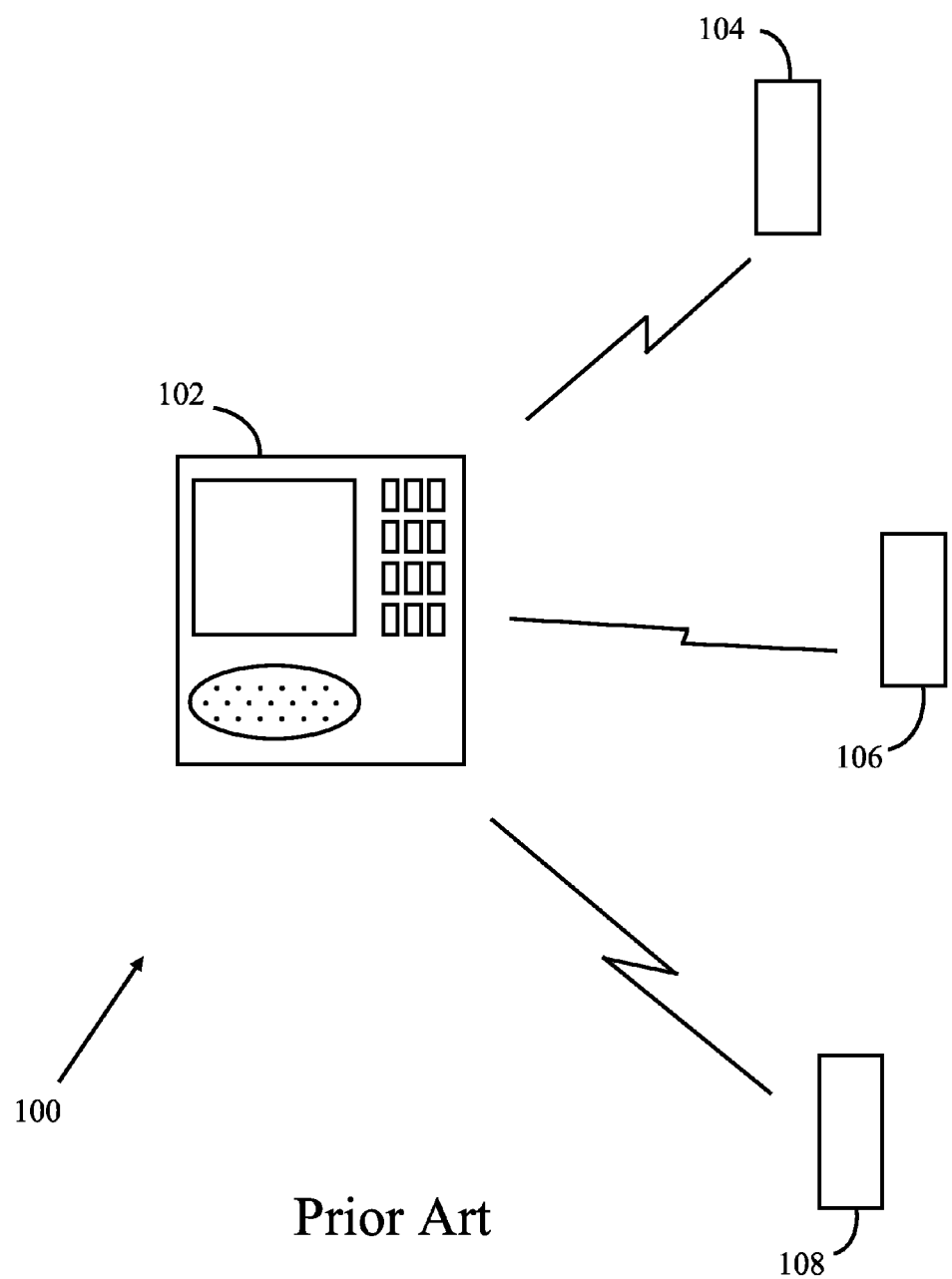
FIG. 1 illustrates prior art home security system comprising a control device and three remote network devices.

FIG. 1 illustrates one embodiment of a simplified block diagram of a prior art home security system 100 comprising a control device 102 and remote network devices 104, 106, and 108. Although only three remote network devices are shown, a greater, or fewer, number of remote network devices may be used in other systems.

Control device 102 comprises one of any number of commercially-available home automation and/or security controllers. It acts as a central control station for one or more sensors, such as remote network devices 104, 106, and 108. Typically, such sensors comprise door/window sensors, tilt sensors, passive infra-red (PIR) sensors (i.e., motion sensors), video cameras, etc., and are deployed throughout residential or business structures on doors frames, windows frames, walls and so on. An example of control device 102 is a Simon XT panel sold by General Electric Corporation of Fairfield, Conn. Control device 102 typically comprises circuitry to wirelessly communicate with any of the remote network devices 104-108 using one or more common communication protocols, such as Z-wave, Zigbee, X-10, Insteon, Wi-Fi, or others.

Typically, remote network devices are introduced to, or registered with, control device 102 so control device 102 knows the number and type of sensors in network 100. For example, in one application, control device 102 may be installed in a convenient location and powered on. Then, a remote network device, such as a door sensor, may be introduced to control device 102, typically by placing both control device 102 and the remote network device into a "learn" mode of operation. The learn mode of operation allows control device 102 to determine the presence of the remote network device, and typically records information provided by the remote network device, such as a serial number that was pre-assigned to the remote network device, a device type, an operational status of the remote network device, and/or other information. Control device 102, in turn, may store this information in an electronic memory for future reference. Once a remote network device has registered with control device 102, it may then function in its intended manner. For example, a door or window sensor may transmit a signal during detection of a change of state, i.e., as a door or window is opened or closed.

Typically, each of the remote network devices and control device 102 communicate with one another using the same communication protocol (e.g., Z-wave, Zigbee, X-10, Insteon, etc). However, some of the more popular communication protocols are hampered by one or more problems, such as a limited communication range, low battery life, relatively expensive manufacturing costs, and bulky designs. In some cases, it would be desirable to replace existing remote network devices (or introduce new ones) that use such deficient protocols with remote network devices that use a different protocol that minimizes the just-mentioned limitations. For example, home security sensors are currently offered that operate in the range of 433 mHz, which allow such sensors to have a much greater communication range and better battery life. However, control device 102 may only be able to communicate using a single communication protocol, so the replacement (or introduction) of remote network devices that use a different communication protocol would be useless. The introduction of a bridge device would be necessary in order to allow communications between control device 102 and remote network devices using disparate communication protocols, as explained below.

Figure 2:
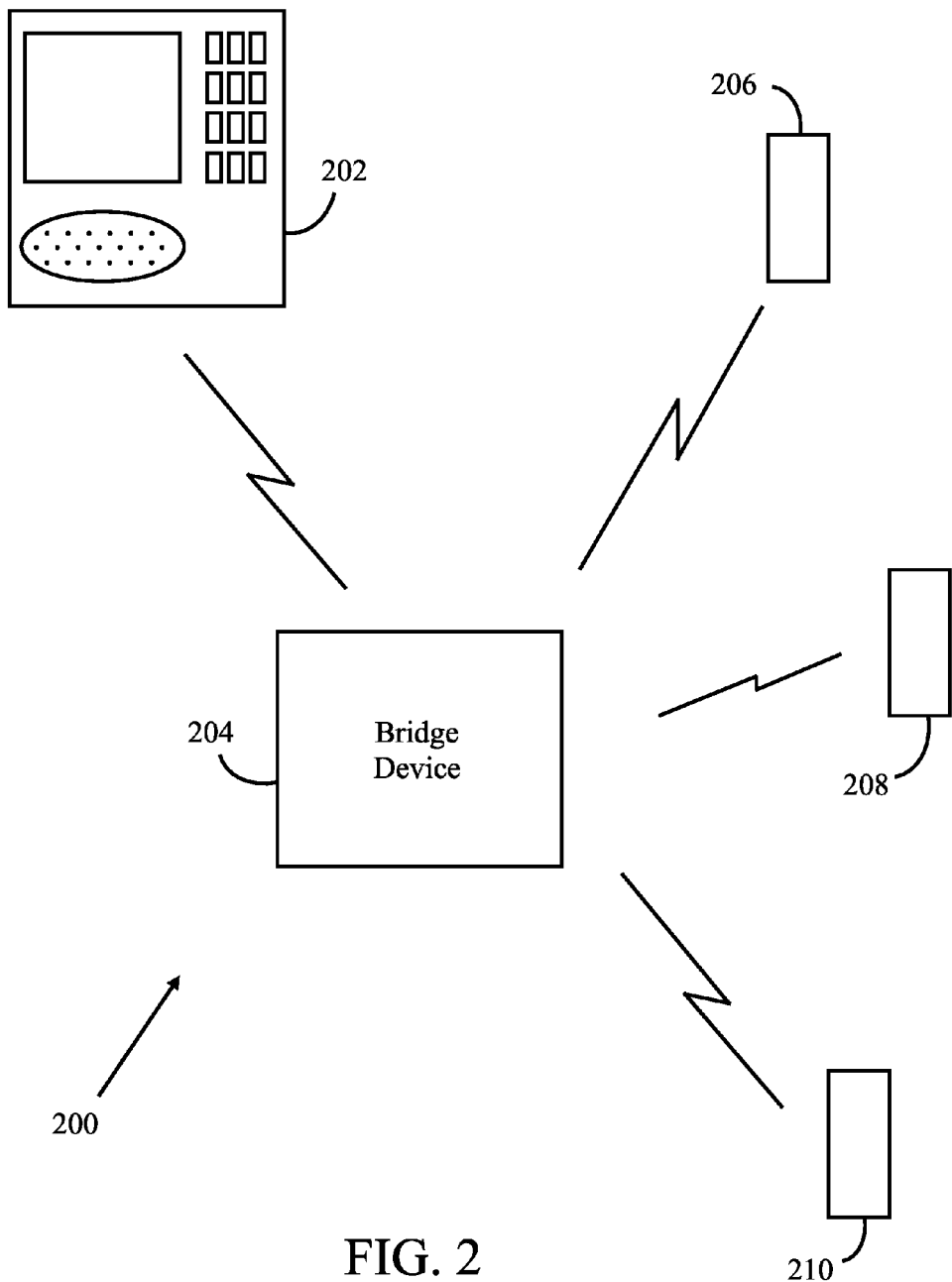
FIG. 2 illustrates a security and/or automation system comprising a control device, a bridge device, and three remote network devices.

FIG. 2 illustrates a security and/or automation system 200 comprising a control device 202, bridge device 204, and remote network devices 206, 208, and 210. It should be understood that a remote network device may comprise a bridge device. Typically, remote network devices 206, 208, and 210 comprise one or more door/window sensors, tilt sensors, passive infra-red (PIR) sensors (i.e., motion sensors), video cameras, etc., and are typically deployed throughout residential or business structures on doors frames, windows frames, walls and so on.

Each of the remote network devices 206-210 use a communication protocol that is different than the one used by control device 202. For example, control device 202 may use the popular Z-wave communication protocol, while each of remote network devices 206, 208, and 210 use an open network protocol such as the Scalable Network Access Protocol (SNAP) which may be used in devices operating at a relatively high frequency, such as 433 mHz. Remote network devices designed to operate as such a frequency typically enjoy a large communication range, long battery life, decreased manufacturing costs, and appealing aesthetic designs.

As mentioned above with respect to FIG. 1, remote network devices 206, 208, and 210, in general, typically "register" with, or are introduced to, control device 202 so that control device 202 knows the number and type of sensors in network 200. However, a direct process of registration between remote network devices 206, 208, and 210 cannot be accomplished, because each of these remote network devices communicates using a different protocol than the one used by control device 202. Bridge 204 is used an intermediary to allow communications between control device 202 and the remote network devices, both for registration purposes and during "normal" operations, e.g., control device 202 sending commands to the remote network devices and the network control devices responding to the commands and/or providing status information to control device 202.

Bridge 204 comprises circuitry to transmit and receive communication signals of a first communication protocol (e.g., for communications with control device 202) and circuitry to transmit and receive communication signals of a second communication protocol (e.g., for communications with remote network devices). Although FIG. 2 suggests wireless communications between bridge 204 and control device 202 and between bridge 204 and remote network devices 206, 208, and 210, in other embodiments, bridge 204 could comprise circuitry that allows it to communicate over other types of communication channels, such as physical conductors, to either control device 202, remote network devices, or both types of devices. In another embodiment, some remote network devices may communicate with bridge 204 wirelessly, while others communicate with bridge 204 over physical conductors. Moreover, in other embodiments, bridge 204 may comprise circuitry that allows communications between two or more communication protocols used by two or more remote network devices over two or more communication channels.

Bridge 204 is typically installed into a location in a home or business in range of any existing or proposed remote network devices and within the range of control device 202. It is typically powered by household power, e.g., 115 VAC, 60 Hz in the United States.

Figure 3:
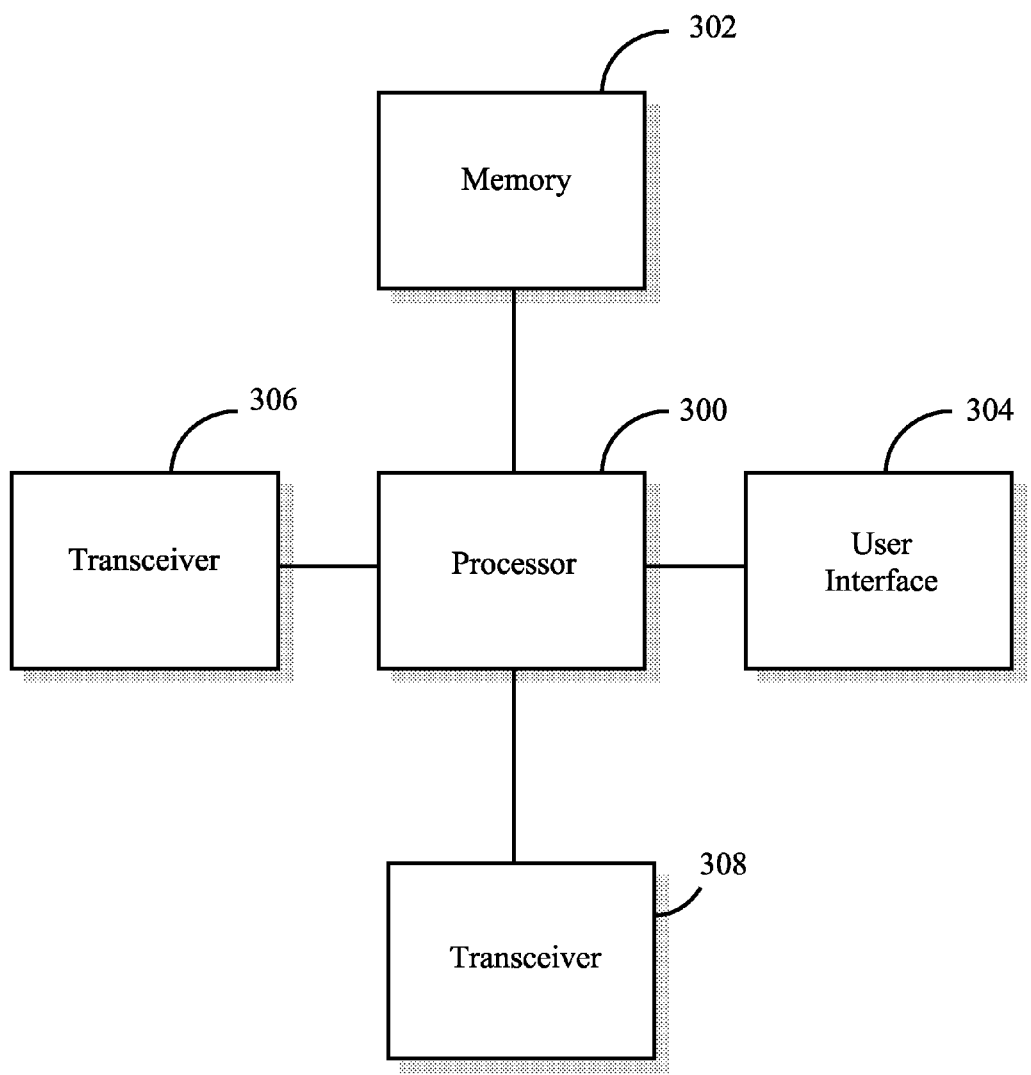
FIG. 3 is a functional block diagram of one embodiment of the bridge device shown in FIG. 2.

FIG. 3 is a functional block diagram of one embodiment of bridge 204. Specifically, FIG. 3 shows processor 300, memory 302, user interface 304, transceiver 306, and transceiver 308. It should be understood that not all of the functional blocks shown in FIG. 3 are required for operation of bridge 204 (for example, transceiver 308 may not be necessary in an embodiment where a first communication protocol and a second communication protocol operate using the same modulation technique), that the functional blocks may be connected to one another in a variety of ways, and that not all functional blocks necessary for operation of bridge 204 are shown (such as a power supply), for purposes of clarity.

Processor 300 is configured to provide general operation of bridge 204 by executing processor-executable instructions stored in memory 302, for example, executable code. Processor 300 typically comprises a general purpose processor, such as an ADuC7024 analog microcontroller manufactured by Analog Devices, Inc. of Norwood Mass., although any one of a variety of microprocessors, microcomputers, and/or microcontrollers may be used alternatively.

Memory 302 comprises one or more information storage devices, such as RAM, ROM, EEPROM, UVPROM, flash memory, CD, DVD, Memory Stick, SD memory, XD memory, thumb drive, or virtually any other type of electronic, optical, or mechanical memory device. Memory 302 is used to store the processor-executable instructions for operation of bridge 204 as well as any information used by processor 200 during operation of bridge 204, such as information regarding one or more remote network devices in system 200, parameter information, identification information, status information, etc.

User interface 304 is coupled to processor 300 and allows a user to control operation of bridge 204 and/or to receive information from bridge 204. User interface 304 may comprise one or more pushbuttons, switches, sensors, keypads, and/or microphones that generate electronic signals for use by processor 300 upon initiation by a user. User interface 304 may additionally comprise one or more seven-segment displays, a cathode ray tube (CRT), a liquid crystal display (LCD), one or more light emitting diode displays (LEDD), one or more light emitting diodes (LEDs), light arrays, or any other type of visual display. Further, the electronic display could alternatively or in addition comprise an audio device, such as a speaker, for audible presentation of information to a user. In one embodiment, user interface 304 comprises a multi-colored LED and a pushbutton.

Transceiver 306 comprises circuitry necessary to transmit and receive communication signals from bridge 204 to control device 202. Such circuitry is well known in the art and may comprise BlueTooth, Wi-Fi, RF, optical, or ultrasonic circuitry, among others. Alternatively, or in addition, transceiver 306 comprises well-known circuitry to provide signals to a remote destination via wiring, such as telephone wiring, twisted pair, two-conductor pair, CAT wiring, or other type of wiring.

Transceiver 308 comprises circuitry necessary to transmit and receive communication signals from bridge 204 to one or more remote network devices. Such circuitry is well known in the art and may comprise Bluetooth, Wi-Fi, RF, optical, or ultrasonic circuitry, among others. Alternatively, or in addition, transceiver 306 comprises well-known circuitry to provide signals to a remote destination via wiring, such as telephone wiring, twisted pair, two-conductor pair, CAT wiring, or other type of wiring.

Bridge 204 may additionally comprise one or more other transceivers, each one designed to communicate with remote network devices using communication protocols other than the one used by transceiver 306. For example, a third transceiver may communicate with a remote network device over a third communication protocol different than the first communication protocol used by remote network device 206 and different than the communication protocol used by control device 202. It should be understood that some of the components and/or software that comprise transceiver 306, transceiver 308, and other transceivers may be common to these transceivers. For example, transceiver 306 and transceiver 308 may transmit on at a particular frequency common to both, while the messaging formats between the two communication protocols differ. In this case, transceiver 306 and transceiver 308 could comprise common RF elements, such as mixers, up-converters, modulators, down-converters, demodulators, and/or software to operate such elements.

Figure 4A:
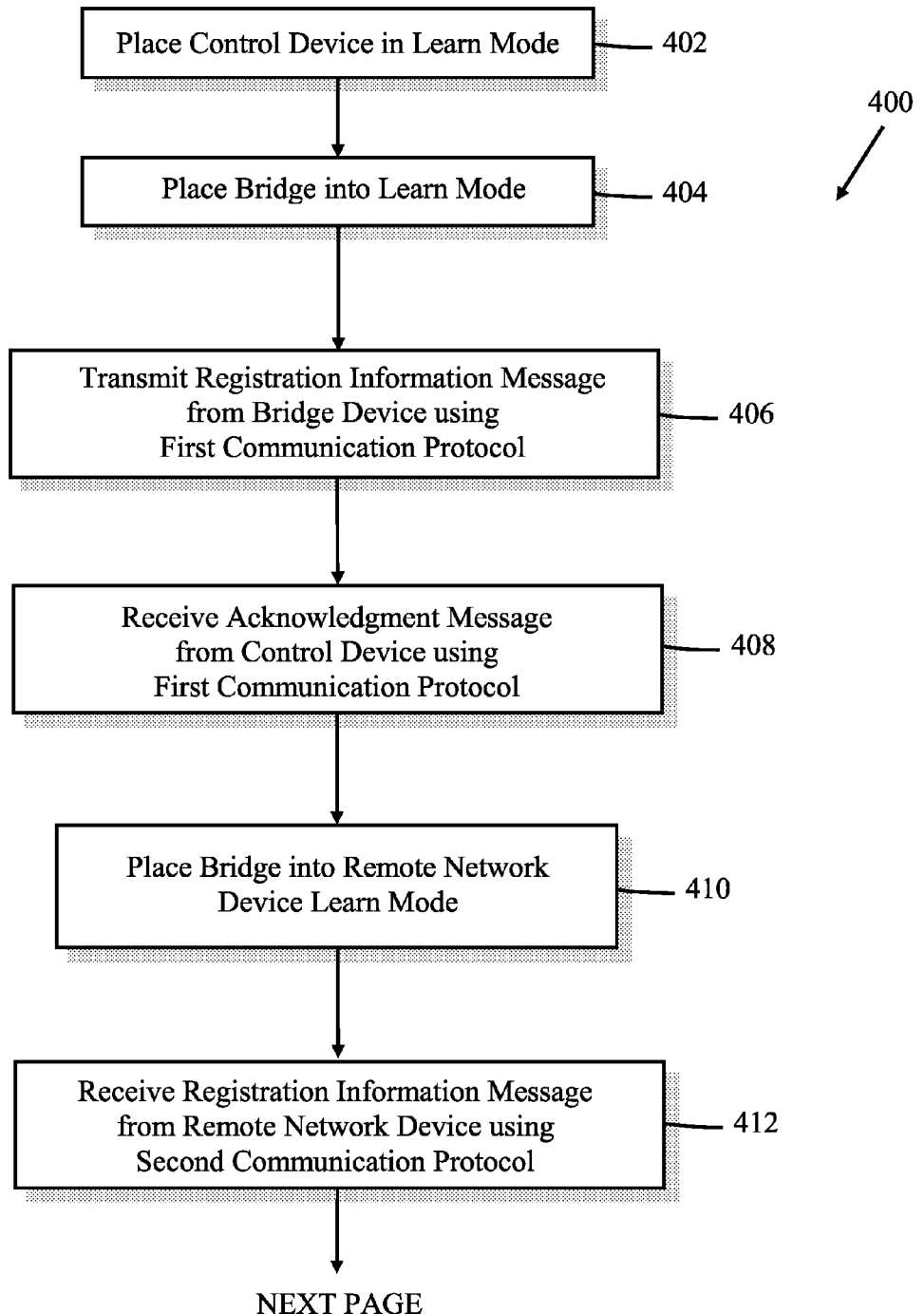
FIGS. 4a and 4b are flow diagrams illustrating one embodiment of a method for allowing a remote network device such as the ones shown in FIG. 2 to register with the control device shown in FIG. 2 when the control device and the remote network device operate using disparate communication protocols.
Figure 4B:
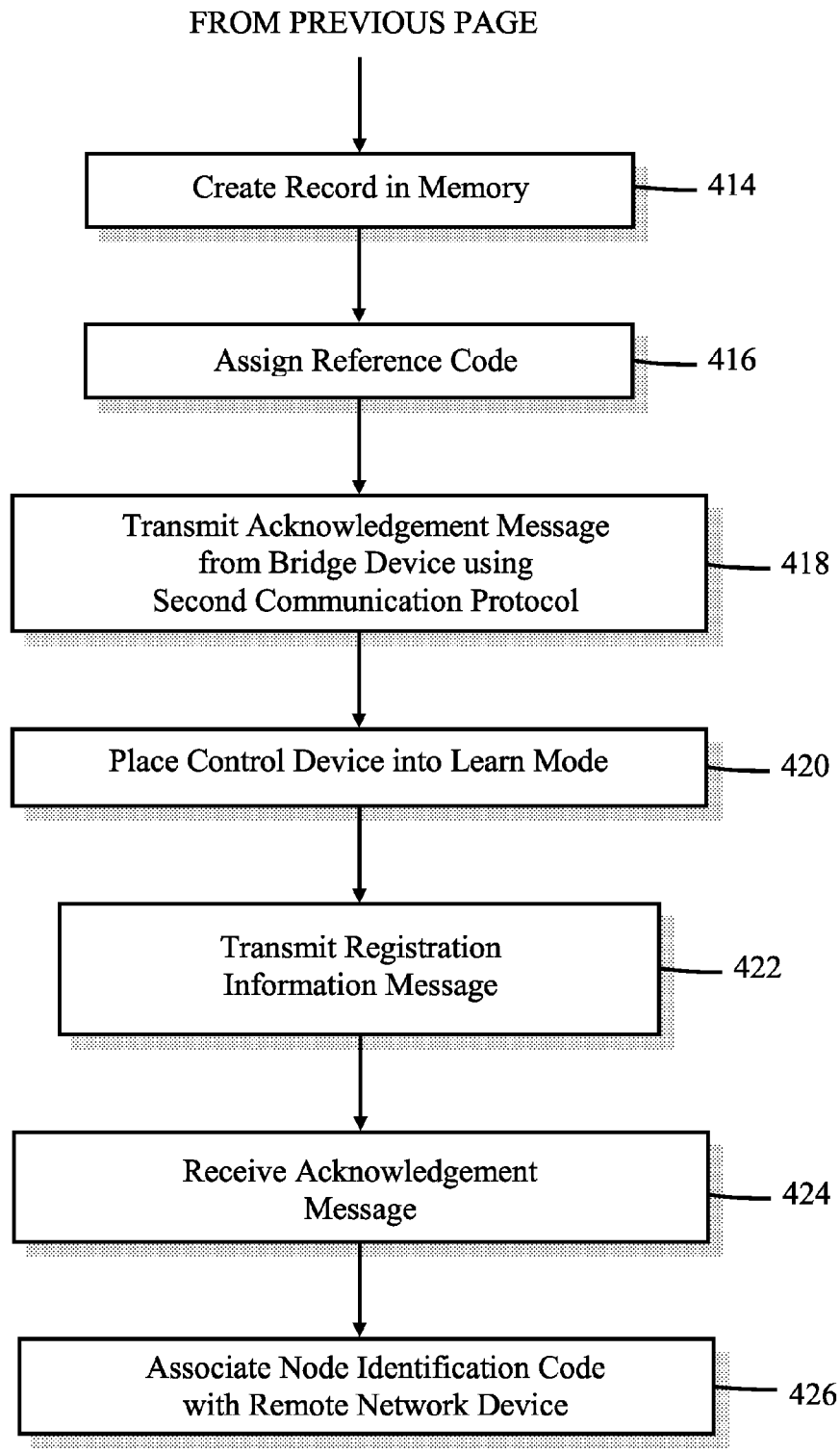

FIGS. 4a and 4b are flow diagrams illustrating one embodiment of a method 400 for allowing a remote network device to register with control device 202 when control device 202 and the remote network device operate using disparate communication protocols. It should be understood that in some embodiments, not all of the steps shown in FIG. 4 are performed. It should also be understood that the order in which the steps are carried out may be different in other embodiments.

At block 402, control device 202 is placed into a "learn" mode of operation from a "normal" mode of operation, typically by pressing one or more pushbuttons on control device 202. Many commercially-available control devices require an initial registration of any network devices that are to be used in system 200, such as bridge 204 and one or more remote network devices. In one embodiment, this registration process is known as "inclusion". In the "normal" mode of operation, control device 202 typically monitors remote network devices for any messages transmitted by those devices, transmits commands instructing remote network devices to perform one or more operations, provides information to users of network 200, provides information to a central monitoring system, etc.

In one embodiment, in response to being placed into learn mode, control device 202 transmits a message requesting that any device that has not been previously registered with control device 202 to respond to the message. In another embodiment, the message instructs any device, registered or not, to respond to the message. In either case, the message is transmitted using a first communication protocol.

At block 404, bridge 204 may also be placed in a "learn" mode of operation from a "normal" mode of operation, typically by pressing one or more pushbuttons on bridge 204. In one embodiment, in response to being placed into learn mode, bridge 204 transmits at least one registration information message to control device 202 using the first communication protocol common to both bridge 204 and control device 202, shown at block 406. The registration information message in either embodiment typically comprises identification information pertaining to bridge 204, such as a pre-assigned serial number, a device type (such as a basic device type, a specific device type, a generic device type, etc.), and/or a device status (e.g., open, closed, temperature, on, off, etc). The identification information may also comprise other information as well, such as the capabilities of bridge 204, for example, whether bridge 204 is capable of repeating messages to other network devices, whether bridge 204 is capable of continually "listening" for incoming messages, etc.

In one embodiment, the registration information message transmitted by bridge 204 comprises a "node information frame" and the first communication protocol comprises the well-known Z-wave communication protocol. The node information frame is part of the Z-Wave protocol and specifies the capabilities of the remote network device, otherwise referred to as a "node" in system 200. These capabilities may comprise a pre-assigned device serial number, the device type, a node identification code, a home identification code, whether the node is able to repeat frames, and/or other protocol-relevant issues. Remote network devices 206-210 may also include similar information as they transmit registration information messages, as described later herein.

When control device 202 receives the identification information from bridge 204 while in learn mode, it assigns a home identification code and a node identification code to bridge 204, typically by creating a record in an electronic memory within control device 202. The record typically comprises some or all of the identification information, along with the just-assigned home identification code and the node identification code. The home identification code is an alpha-numeric code that identifies a particular network, such as system 200 and is typically unique to a particular home or business. Generally, network devices having the same house code can communicate with each other, while network devices having a different home identification code may not. The home identification code is typically assigned by a processor inside control device 202 in conjunction with processor-executable instructions and data stored within an electronic memory.

The node identification code is an alpha-numeric code that uniquely identifies each node, or device, in system 200. Remote network devices 206, 208, and 210, as well as bridge 204, may be considered nodes. Control device 202 assigns a node identification code that is unique to each device in network 200 as devices are introduced, or registered, to/with control device 202. The term "node identification code" may also be referred to as simply "identification code".

In one embodiment, after control device 202 has assigned a home identification code and node identification code to bridge 204, an acknowledgment message is transmitted using the first communication protocol, informing bridge 204 of its assigned house and node identification codes. In another embodiment, an acknowledgement message is transmitted to bridge 204 using the first communication protocol, but the house and node identification information is not sent. In yet another embodiment, no message is transmitted to bridge 204. If such an acknowledgement message is transmitted, it is received by bridge 204 at block 204, using the first communication protocol.

After bridge 204 has been successfully registered with control device 202, an audible or visual indication may be presented to a user to signify the registration. Typically, information regarding the registration may be accessible to a user via a display located on control device 202. For example, after a successful registration, an LED may be illuminated for a predetermined time period and a user may be able to view the assigned house and node identification codes associated with bridge 204, as well as other information, such as some or all of the identification information. Frequently, the user may add further information pertaining to each device registered with control device 202, such as a location of a device (e.g., "front door", "window in living room", "garage door", etc). After successful device registration, control device 202 and/or bridge 204 are typically returned to a "normal" mode of operation, either automatically, after a predetermined time period, or by a user of system 200.

At some point later, a user of system 200 may want to register one or more remote network devices with control device 202 that do not communicate using the same communication protocol as control device 202. In that case, these remote network devices register with bridge 204 which, in turn, registers them with control device 202.

In one embodiment, to achieve remote network device registration, bridge 204 may be placed into a third mode of operation (first mode being "normal" mode, second mode being "learn" mode described above), referred to herein as remote network device learn mode, shown at block 410. The remote network device learn mode allows bridge 204 to receive registration information messages from one or more remote network devices so that remote network devices may be registered with bridge 204. Registering with bridge 204 enables bridge 204 to properly route messages to intended devices, as will be explained later herein.

In one embodiment, in response to being placed in the third mode of operation, e.g., second learn mode, bridge 204 transmits a message to, for example, remote network device 206 using a second communication protocol via transceiver 308, requesting that it (or any other unregistered remote network device) to respond to the message with a registration information request. The second communication protocol is different than the first communication protocol. Upon receipt of the message, remote network device 206 responds by transmitting identification information to bridge 204 using the second communication protocol. In another embodiment, after bridge 204 is placed into the third mode of operation, remote network device 206 is placed into a "learn" mode, where, in response, remote network device 206 transmits at least one registration information message to bridge 204 using the second communication protocol, the message comprising identification information related to remote network device 206. The identification information transmitted by remote network device 206 in either embodiment typically comprises a pre-assigned serial number, a device type (such as a basic device type, a specific device type, a generic device type, etc.), and/or a device status (e.g., open, closed, temperature, on, off, etc). The identification information may also comprise other information as well, such as the capabilities of remote network device 206, for example, whether remote network device 206 is capable of repeating messages to other network devices, whether remote network device 206 is capable of continually "listening" for incoming messages, etc.

In one embodiment, the registration information message transmitted by remote network device 206 comprises a "node information frame", described above.

At block 412, bridge 204 receives the registration information message from remote network device 206 via transceiver 308, using the second communication protocol common to bridge 204 and remote network device 206.

When bridge 204 receives the identification information from remote network device 206, processor 300 creates a record in memory 302, shown at block 414. The record comprises at least some of the identification information in the registration information message. In addition, processor 300 may assign a reference code to remote network device 206 and associate the reference code with remote network device 206, e.g., the identification information stored in the record inside memory 302, at block 416. The reference code is used by processor 300 to identify remote network devices that have "registered" with bridge 204, e.g., have had a record created in memory 302. For example, the reference code may comprise one of a series of alpha-numeric codes. For purposes of example, it is assumed that remote network device 206 is the first device to register with bridge 204 and is assigned a reference code equal to "1".

At block 418, bridge 204 may transmit an acknowledgement message to remote network device 206 using the second communication protocol, indicating that remote network device 206 has been successfully registered with bridge 204. The acknowledgement message may comprise the reference code and/or other information indicating that remote network device 206 has been registered with bridge 204. When remote network device 206 receives the acknowledgement message from bridge 204, it may store the reference code in a memory within remote network device 206. It may also automatically enter a "normal" mode of operation, e.g., monitoring for a particular event and transmitting a status message to bridge 204 if the particular event occurs. Alternatively, or in addition, it may provide a visual and/or audible alert to a user that it has been registered with bridge 204. Subsequent transmissions from remote network device 206 may include the reference code to identify remote network device 206, in this case reference code "1".

After remote network device 206 has successfully registered with bridge 204, an audible or visual indication may be presented by bridge 204 to a user to signify the registration. Typically, information regarding the registration may be accessible to a user via a user interface 304 located on bridge 204. For example, after a successful registration, an LED may be illuminated for a predetermined time period and a user may be able to view the identification information stored within memory 302. Frequently, the user may add further information pertaining to each device registered with bridge 204, such as a location of a remote network device (e.g., "front door", "window in living room", "garage door", etc). After successful device registration, bridge 204 and/or remote network device 206 are typically returned to a "normal" mode of operation, either automatically, after a predetermined time period, or by a user of system 200.

At some time later, the identification information stored in memory 302 relating to remote network device 206 is provided to control device 202 to complete the registration process. In one embodiment, identification information related to other remote network devices that have registered with bridge 204 may be sent as well so that multiple remote network devices may be registered at one time. This process is shown beginning at block 420.

In one embodiment, at block 420, control device 202 is placed into learn mode once again.

At block 422, in one embodiment, bridge 204 automatically transmits one or more registration information messages on behalf of remote network device 206 to control device 202 using the first communication protocol. In one embodiment, the registration information message(s) normally comprises a node identification code of bridge 204 that was assigned by control device 202 at blocks 402-408. However, at block 422, when bridge 204 transmits the registration information message on behalf of remote network device 206, bridge 204 inserts a default node identification code indicating that registration has not yet occurred. Bridge 204 also inserts identification information into the registration information message relating to remote network device 206. In essence, bridge 204 masquerades as remote network device 206 attempting to register with control device 202 for the first time.

In another embodiment, bridge 204 does not transmit one or more registration information messages at block 422 until after it has been placed into a fourth mode of operation (first mode being "normal" mode, second mode being "learn" mode, third being remote network device learn mode, described above), referred to herein as remote network device registration mode. In yet another embodiment, bridge 204 does not transmit a registration information message until it receives a message from control device 202 requesting bridge 204 to provide such a message.

When control device 202 receives the registration information message from bridge 204, it assigns a home identification code and/or a node identification code to what control device 202 believes to be remote network device 206, typically by creating a record in the electronic memory within control device 202. The record typically comprises some or all of the identification information contained in the registration information message, along with the just-assigned home identification code and the node identification code. Thus, remote network device 206 is registered with control device 202 via bridge 204.

In one embodiment, after control device 202 has created the record in memory and assigned a house identification code and/or node identification code, it may automatically exit the learn mode, if it is required that control device 202 be placed in learn mode in order to register devices. However, in another embodiment, control device 202 is able to process more than one registration information message before automatically reverting to a normal mode of operation. Thus, in this embodiment, control device may receive a registration information message relating to a first remote network device that has previously registered with bridge 204, and at some subsequent time, receive a second information message relating to a second remote network device that has previously registered with bridge 204. This process may continue until all remote network devices that have previously registered with bridge 204 have had their respective identification information transmitted to control device 202. In one embodiment, bridge 204 waits to receive an acknowledgement message transmitted by control device 202, indicating successful registration of any previous registration information messages that were transmitted.

In one embodiment, control device 202 generates an acknowledgment message that is received by bridge 204 indicating that registration was successful at block 424. In another embodiment, this message additionally comprises the just-assigned home identification code and/or the node identification code. In either case, the acknowledgement message conforms to the first communication protocol.

After remote network device 206 has successfully registered with control device 202, an audible or visual indication may be presented to a user to signify the registration, the indication presented by either control device 202, bridge 204, or both. Typically, information regarding the registration may be accessible to a user via a display located on either bridge 204 or control device 202. For example, after a successful registration, an LED may be illuminated for a predetermined time period on control device 202 and a user may be able to view the identification information, home identification code, and/or node identification code associated with each registered network control device registered with control device 202. Frequently, the user may add further information pertaining to each device registered with control device 202, such as a location of a remote network device (e.g., "front door", "window in living room", "garage door", etc). After successful device registration, bridge 204 and control device 202 are typically returned to a "normal" mode of operation, either automatically, after a predetermined time period, or by a user of system 200.

In one embodiment, shown as block 426, bridge 204 stores the home identification code and/or node identification code contained within the acknowledgment message received at block 424 in memory 302 and associates the home identification code and/or node identification code with remote network device 206. The association of the home identification code and/or node identification code with remote network device 206 may be referred to as the creation of a "virtual node," and enables messages destined for remote network device 206, received by bridge 204 using the second communication protocol, to be correctly addressed to remote network device 206 using the second communication protocol.

In one embodiment, the home identification code and/or node identification code provided by control device 202 is associated with the reference code assigned to remote network device 206 by bridge 204 at block 416. For example, if control device 202 assigned a node identification code of "14" to bridge 204 after receiving the registration information message from bridge 204 at block 422, bridge 204 stores the node identification code ("14") in memory 302 in association with the reference code ("1") that bridge 204 assigned to remote network device 206 at block 416. Then, when a subsequent message is received by bridge 204 from control device 202, addressed to node 14 (i.e., remote network device 206), bridge 204 looks up a record in memory 302 associated with node identification code 14 and determines from the record that node identification code 14 corresponds to remote network device 206, identified in the record as reference code "1". Bridge 204 then re-transmits the message using the second communication protocol, addressing remote network device 206 using reference code "1".

In another embodiment, where a reference code is not used, the home identification code and/or node identification code received at block 516 is associated with remote network device 206 by storing the home identification code and/or node identification code in the record associated with remote network device 206. Then, when a subsequent message is received by bridge 204 from control device 202, addressed to node 14 (i.e., remote network device 206), bridge 204 looks up a record in memory 302 associated with node identification code 14 and determines from the record that node identification code 14 corresponds to remote network device 206, identified in the record by information such as a serial number associated with remote network device 206. Bridge 204 then re-transmits the message from control device 202 using the second communication protocol, addressing remote network device 206 using the serial number associated in the record with node 14.

Figure 5A:
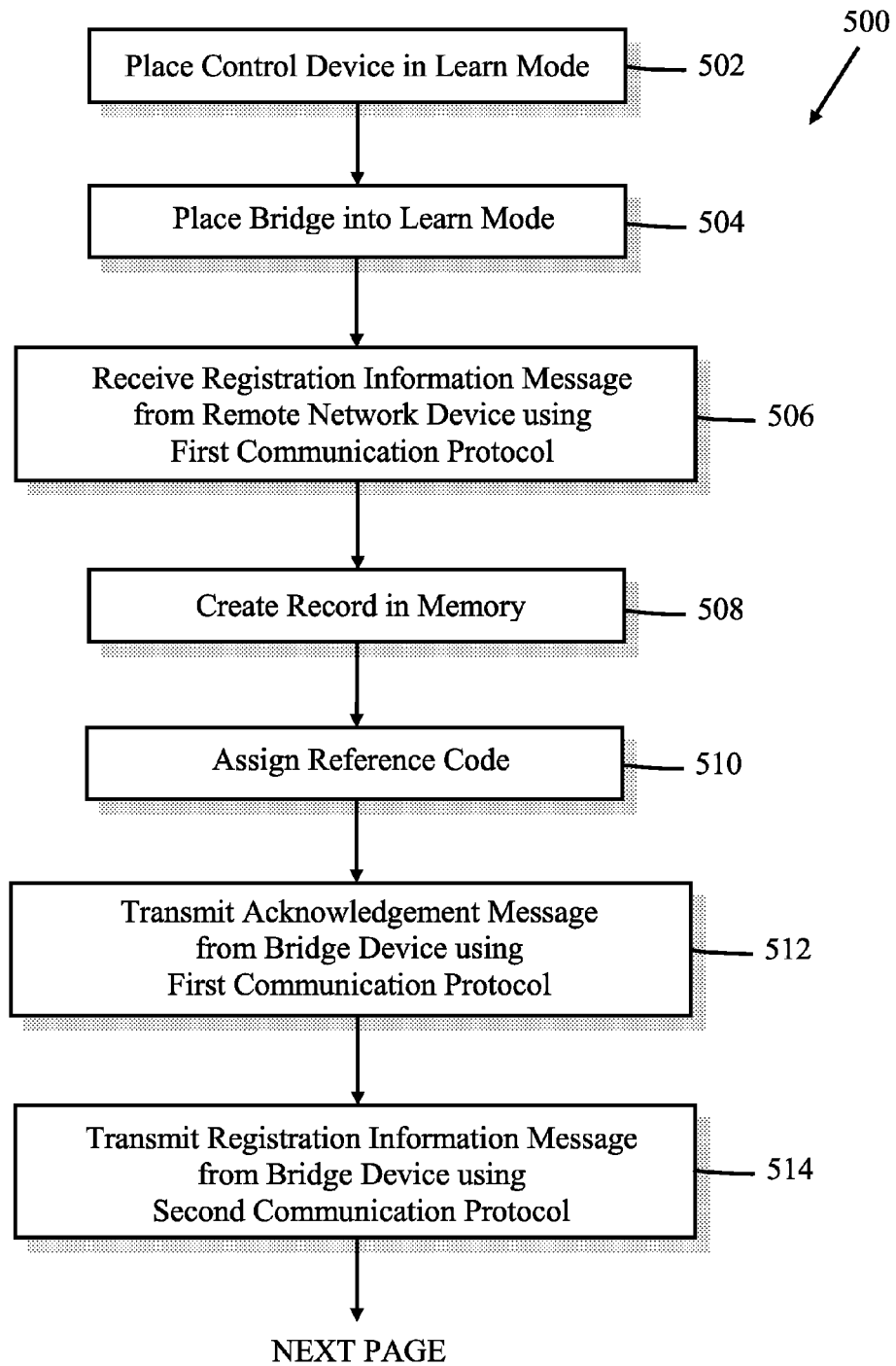
FIGS. 5a-5c are flow diagrams illustrating another embodiment of a method for allowing a remote network device such as the ones shown in FIG. 2 to register with the control device shown in FIG. 2 when the control device and the remote network device operate using disparate communication protocols.
Figure 5B:
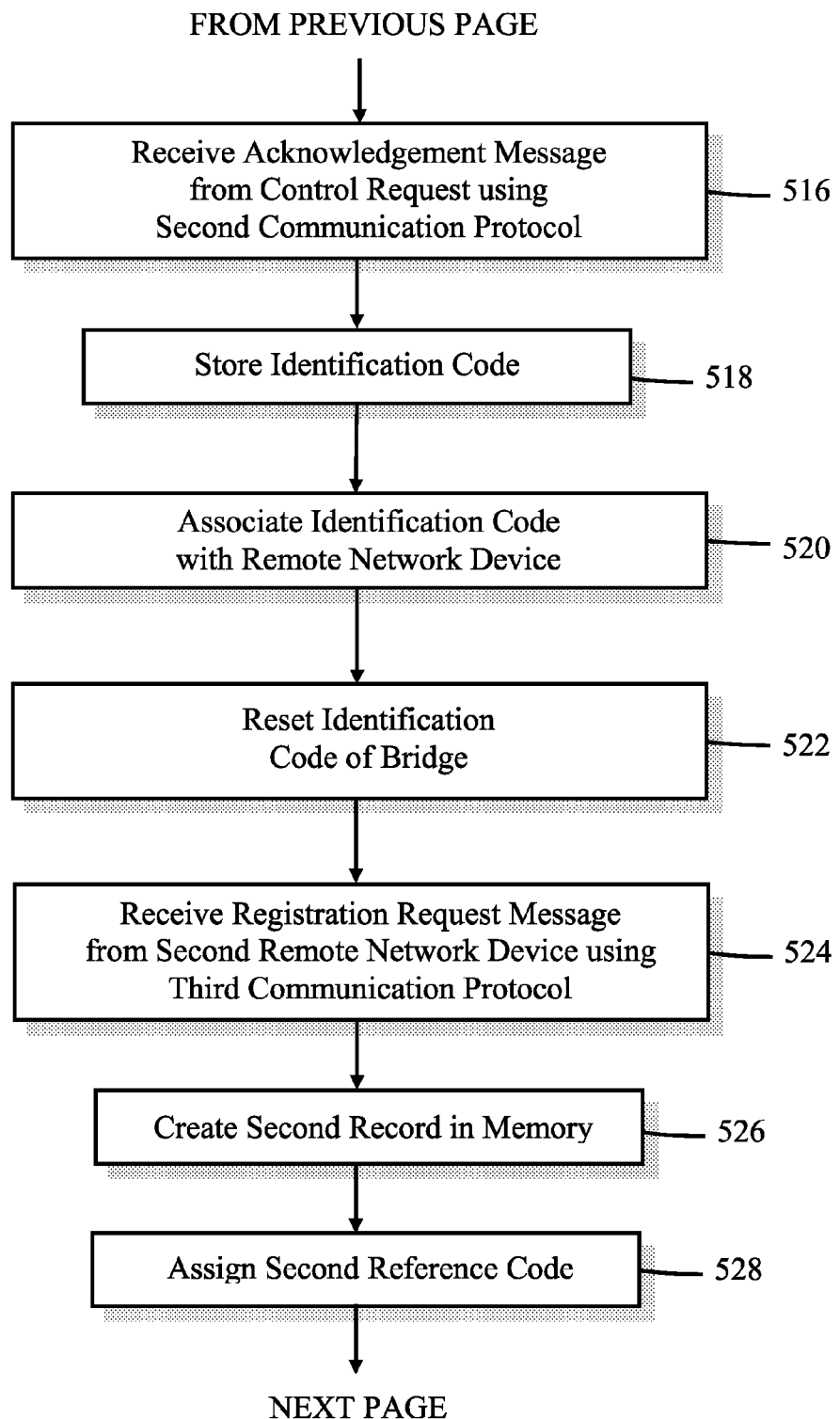
Figure 5C:
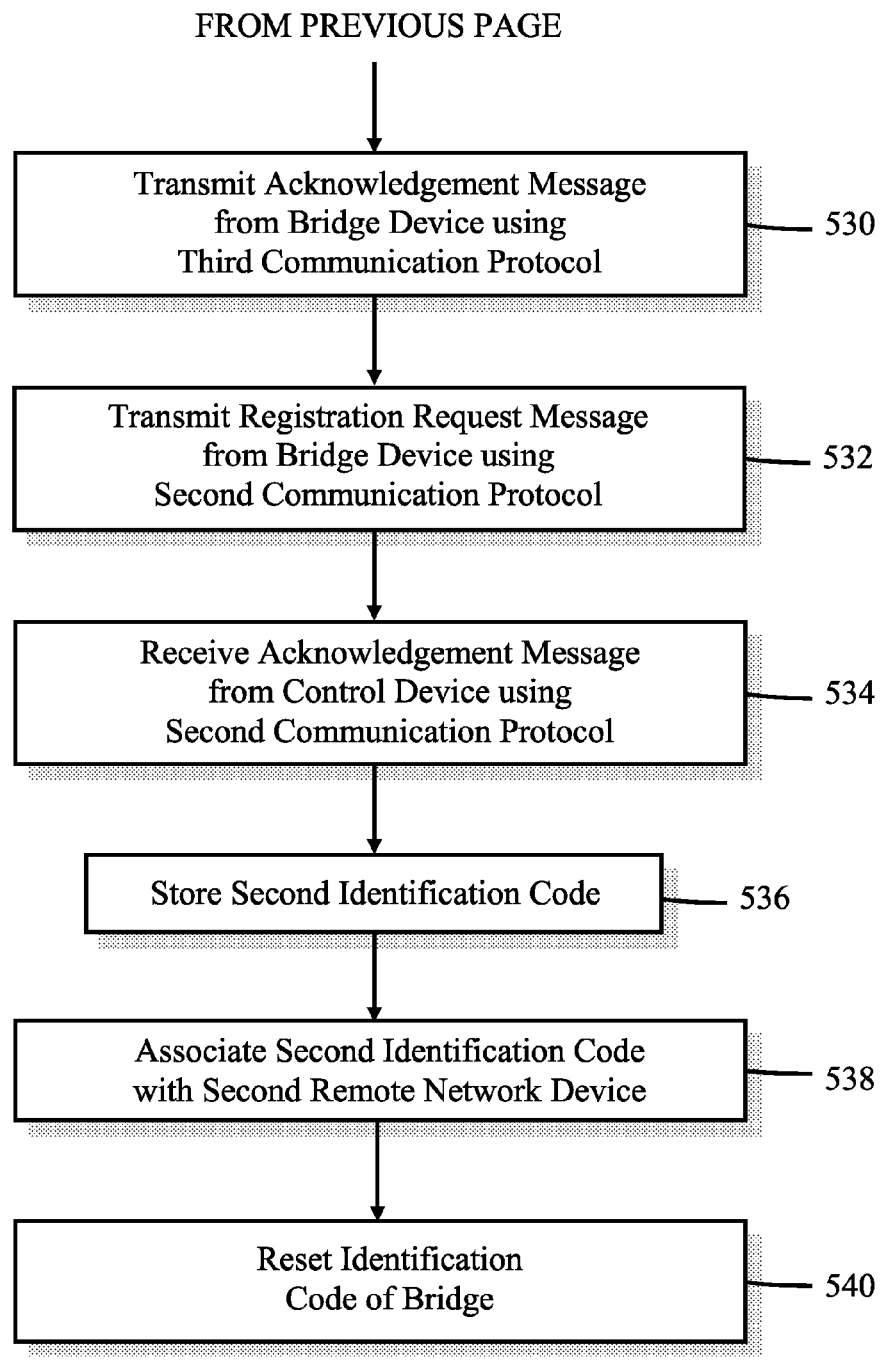

FIGS. 5a-5c are flow diagrams illustrating another embodiment of a method 500 for allowing a remote network device to register with control device 202 when control device 202 and the remote network device operate using disparate communication protocols. It should be understood that in some embodiments, not all of the steps shown in FIG. 5 are performed. It should also be understood that the order in which the steps are carried out may be different in other embodiments.

At block 502, control device 202 is placed into a "learn" mode of operation from a "normal" mode of operation typically by pressing one or more pushbuttons on control device 202. In the learn mode of operation, control device may accept registration information messages from remote network devices and, in response, register, or add them, as a functioning unit within network 200. In the normal mode of operation, control device typically receives status messages from remote network devices (e.g., door/window open/closed, motion detected, audio and/or video data, "tile" information, etc) and/or transmits messages to the remote network devices instructing one or more of them to perform an action, such as determine a status of the remote network device, perform a survey of other remote network devices within range of a remote network device, transmit a status of a remote network device, etc.

In one embodiment, in response to being placed into learn mode, control device 202 transmits a message requesting that any device that has not been previously registered with control device 202 to respond to the message. In another embodiment, the message instructs any device, registered or not, to respond to the message. In either case, the message is transmitted using a first communication protocol.

At block 504, bridge 204 may also be placed into a "learn" mode of operation from a "normal" mode of operation typically by pressing one or more pushbuttons on bridge 204. In the learn mode of operation, bridge 204 accepts registration information messages from remote network devices using a first communication protocol and stores information contained in the registration information messages so that the remote network devices may be accessible to control device 202, as described below. In another embodiment, bridge 204 helps to register remote network devices automatically without having to be placed into a learn mode by a user.

In one embodiment, in response to being placed into learn mode, bridge 204 transmits a message using a first communication protocol, requesting that any remote network device that has not been previously registered with bridge 204 to respond to the message. In another embodiment, the message instructs any device, registered or not, to respond to the message. In either case, the message is transmitted using a first communication protocol common to both bridge 204 and one or more remote network devices. In response to receiving the message, one or more remote network devices responds by transmitting a registration information message using the first communication protocol. In the present example, remote network device 206 has not yet been registered with bridge 204. The registration information message typically comprises identification information pertaining to remote network device 206, such as a pre-assigned serial number, a device type (such as a basic device type, a specific device type, a generic device type, etc.), and/or a device status (e.g., open, closed, temperature, on, off, etc). The identification information may also comprise other information as well, such as the capabilities of remote network device 206, for example, whether remote network device 206 is capable of repeating messages to other network devices, whether remote network device 206 is capable of continually "listening" for incoming messages, etc.

At block 506, bridge 204 receives a registration information message from a remote network device, such as remote network device 206 (in this example, remote network device 206 comprises a window sensor) using a first communication protocol common to remote network device 206 and bridge 204, such as the well-known Zigbee brand communication protocol. The registration information message need not be used exclusively for device registration. For example, in a Z-wave-based network, messages transmitted by remote network devices comprises a home identification code and a node identification code if a device has been previously registered, or "included", with control device 202. Unregistered devices do not transmit a home identification code or node identification code, or, in another embodiment, a default home and/or node identification code is used that is recognized by control device 202 as a default code used by unregistered devices. Thus, receipt of a registration information message, such as a "node information frame", that does not include a pre-assigned home identification code and/or node identification code may be considered a registration information message by control device 202 or bridge 204.

In any case, the registration information message typically comprises identification information, typically a pre-assigned serial number, a device type (such as a basic device type, a specific device type, a generic device type, etc.), and/or a device status (e.g., open, closed, temperature, on, off, tilt information, etc). The identification information may also comprise other information as well, such as the capabilities of remote network device 206, for example, whether remote network device 206 is capable of repeating messages to other network devices, whether remote network device 206 is capable of continually "listening" for incoming messages, a list of other remote network devices in range of remote network device 206, etc.

At block 508, processor 300 inside bridge 204 creates a record in memory 302. The record comprises at least some of the identification information in the registration information message. In addition, processor 300 may assign a reference code to remote network device 206 and associate the reference code with remote network device 206, e.g., the identification information stored in the record inside memory 302, as shown at block 510. The reference code may be used by processor 300 to identify remote network devices that have "registered" with bridge 204, e.g., have had a record created in memory 302. For example, the reference code may comprise one of a series of alphanumeric codes. For purposes of example, it is assumed that remote network device 206 is the first device to register with bridge 204 and is assigned a reference code equal to "1".

At block 512, bridge 204 may transmit an acknowledgement message to remote network device 206 using the first communication protocol, indicating that remote network device 206 has been successfully registered with bridge 204. In another embodiment, no acknowledgment message is transmitted (some remote network devices do not have the capability to receive messages). The acknowledge message may comprise the reference code and/or other information (e.g., the time of registration) indicating that remote network device 206 has been registered with bridge 204. When remote network device 206 receives the acknowledgement message from bridge 204, it may store the reference code in a memory within remote network device 206. It may also automatically enter a "normal" mode of operation, e.g., monitoring for a particular event and transmitting a status message to bridge 204 if the particular event occurs. Alternatively, or in addition, it may provide a visual and/or audible alert to a user that it has been registered with bridge 204. Subsequent transmissions from remote network device 206 may include the reference code to identify remote network device 206, in this case reference code "1".

At some time after block 512, bridge 204 transmits a registration information message on behalf of remote network device 206 to control device 202 using a second communication protocol that is common to bridge 204 and control device 202, such as the well-known Z-wave communication protocol. This is shown as block 514. Many communication protocols, including the Z-wave protocol, comprise rules for registering remote network devices with control device 202. For example, in order for a Z-wave compatible remote network device to register with a Z-wave compatible control device 202, the remote network device transmits a "node information frame", which is a message that comprises identifying characteristics of the particular remote network device, such as a per-assigned serial number, device type, device status, etc. The node information frame may be repeated for any number of times and may terminate when, for example, an acknowledgement message is received from control device 202 or bridge 204, as the case may be. When received by control device 202 while in a learn mode of operation, the remote network device is registered with, or "included", into control device 202, thereby allowing it to become an operational node within a network of remote network devices managed by control device 202.

The registration information message transmitted by bridge 204 at block 514 typically comprises a pre-assigned serial number of remote network device 206 and an indication of a remote network device 206 type. The registration information message may also comprise an indication of the status of remote network device 206 and/or capabilities of remote network device 206. Thus, bridge 204, in essence, masquerades as remote network device 206.

In response to receiving the registration information message, control device 202 adds remote network device 206 as a functioning "node" in network 200 by assigning a home identification code and/or a node identification code to bridge 204, believing that bridge 204 is remote network device 206 (as the registration information message received by control device 202 identifies remote network device 206). A record is created by control device 202, associating the home identification code and/or node identification code with remote network device 206. Subsequent messages transmitted from control device 202 to remote network device 206 comprise the assigned home identification code and/or node identification code as a way to target, or address, remote network device 206.

After network control device 206 has been registered with control device 202, control device 202 may transmit an acknowledgement message back to bridge 204 using the second communication protocol, the acknowledgement message typically comprising the just-assigned home identification code and/or node identification code as an indication that remote network device 206 has been successfully registered with control device 202.

At block 516, bridge 204 receives the acknowledgement message transmitted by control device 202 using the second communication protocol. In response, in one embodiment shown at block 518, bridge 204 stores the home identification code and/or node identification code contained within the acknowledgment message in memory 302 and associates the home identification code and/or node identification code with remote network device 206, as shown in block 520. The association of the home identification code and/or node identification code with remote network device 206 may be referred to as the creation of a "virtual node," and enables messages destined for remote network device 206, received by bridge 204 using the second communication protocol, to be correctly addressed to remote network device 206 using the first communication protocol. In one embodiment, the home identification code and/or node identification code provided by control device 202 is associated with the reference code assigned to remote network device 206 by bridge 204 at block 510. For example, if control device 202 assigned a node identification code of "23" to bridge 204 after receiving the registration information message from bridge 204 at block 514, bridge 204 stores the node identification code ("23") in memory 302 in association with the reference code ("1") that bridge 204 assigned to remote network device 206 at block 510. Then, when a subsequent message is received by bridge 204 from control device 202, addressed to node 23 (i.e., remote network device 206), bridge 204 looks up a record in memory 302 associated with node identification code 23 and determines from the record that node identification code 23 corresponds to remote network device 206, identified in the record as reference code "1". Bridge 204 then re-transmits the message using the first communication protocol, addressing remote network device 206 using reference code "1".

In another embodiment, where a reference code is not used, the home identification code and/or node identification code received at block 516 is associated with remote network device 206 by storing the home identification code and/or node identification code in the record associated with remote network device 206. Then, when a subsequent message is received by bridge 204 from control device 202, addressed to node 23 (i.e., remote network device 206), bridge 204 looks up a record in memory 302 associated with node identification code 23 and determines from the record that node identification code 23 corresponds to remote network device 206, identified in the record by information such as a serial number associated with remote network device 206. Bridge 204 then re-transmits the message from control device 202 using the first communication protocol, addressing remote network device 206 using the serial number associated in the record with node 23.

At block 522, bridge 204 may reset the home identification code and/or node identification code of bridge 204. In some embodiments, the home identification code and/or node identification code received by bridge 204 at block 516 is stored in memory 302 and, either additionally or alternatively, associated with bridge 204, in accordance with, for example, the second communication protocol. Thus, at block 522, bridge 204 may reset the home identification code and/or node identification code associated with bridge 204 by, in one embodiment, erasing the home identification code and/or node identification code in memory 302. In another embodiment, a default home identification code and/or node identification code replaces the home identification code and/or node identification code in memory 302 that was previously associated with bridge 204. In yet another embodiment, the home identification code and/or node identification code remains stored in memory, but is dis-associated with bridge 204. In other words, while the home identification code and/or node identification code remains stored in memory (and associated with remote network device 206), bridge 204 ignores this information and does not include the home identification code and/or node identification code in subsequent transmissions.

At block 524, bridge 204 receives a registration information message from a second remote network device, for example remote network device 208 (in this example, remote network device 208 comprises a door sensor), using a third communication protocol common to the remote network device 208 and bridge 204. The third communication protocol may be the same as the first communication protocol or it may be different.

As noted previously, the registration information message received from remote network device 208 typically comprises identification information, typically a pre-assigned serial number, a device type (such as a basic device type, a specific device type, a generic device type, etc.), and/or a device status (e.g., open, closed, temperature, on, off, tilt information, etc). The identification information may also comprise other information as well, such as the capabilities of remote network device 208, for example, whether remote network device 208 is capable of repeating messages to other network devices, whether remote network device 208 is capable of continually "listening" for incoming messages, a list of other remote network devices in range of remote network device 208, etc.

At block 526, processor 300 inside bridge 204 creates a second record in memory 302. The second record comprises at least some of the identification information in the registration information message from remote network device 208. In addition, processor 300 may assign a second reference code to remote network device 208, different than the one assigned to remote network device 206, and associate the second reference code with remote network device 208, e.g., the identification information stored in the second record inside memory 302, at block 528. For purposes of this example, it is assumed that remote network device 208 is the second device to register with bridge 204 and is assigned a reference code equal to "2".

At block 530, bridge 204 may transmit an acknowledgement message to remote network device 208 using the third communication protocol, indicating that remote network device 208 has been successfully registered with bridge 204. The acknowledge message may comprise the reference code and/or other information indicating that remote network device 208 has been registered with bridge 204. In another embodiment, an acknowledgement message is sent to remote network device 208 only after it has been successfully registered with control device 202. When remote network device 208 receives the acknowledgement message from bridge 204, it may store the reference code in a memory within remote network device 208. It may also automatically enter a "normal" mode of operation, e.g., monitoring for a particular event and transmitting a status message to bridge 204 if the particular event occurs. Alternatively, or in addition, it may provide a visual and/or audible alert to a user that it has been registered with bridge 204. Subsequent transmissions from remote network device 208 may include the reference code to identify remote network device 208, in this case reference code "2".

At some time after block 530, bridge 204 transmits a registration information message on behalf of remote network device 208 to control device 202 using a second communication protocol that is common to bridge 204 and control device 202, such as the well-known Z-wave communication protocol. This is shown as block 532.

The registration information message transmitted by bridge 204 at block 530 typically comprises a pre-assigned serial number of remote network device 208 and an indication of a remote network device 208 type. The registration information message may also comprise an indication of the status of remote network device 208 and/or capabilities of remote network device 208.

In response to receiving the registration information message, control device 202 adds remote network device 208 as a functioning "node" in network 200 by assigning a home identification code and/or a node identification code to bridge 204, believing that bridge 204 is remote network device 208 (as the registration information message received by control device 202 identifies remote network device 208). A second record is created by control device 202, associating the home identification code and/or node identification code with remote network device 208, e.g., the information contained in the registration information message. Subsequent messages transmitted from control device 202 to remote network device 208 typically comprise the assigned home identification code and/or node identification code as a way to target, or address, remote network device 208.

After network control device 208 has been registered with control device 202, control device 202 may transmit an acknowledgement message back to bridge 204 using the second communication protocol, the acknowledgement message typically comprising the just-assigned home identification code and/or node identification code as an indication that remote network device 208 has been successfully registered with control device 202.

At block 534, bridge 204 receives the acknowledgement message transmitted by control device 202 using the second communication protocol. In response, in one embodiment shown at block 534, bridge 204 stores the home identification code and/or node identification code contained within the acknowledgment message in memory 302 and associates the home identification code and/or node identification code with remote network device 208, as shown in blocks 536 and 538. The association of the home identification code and/or node identification code with remote network device 208 may be referred to as the creation of a "virtual node," and enables messages destined for remote network device 208, received by bridge 204 using the second communication protocol, to be correctly addressed to remote network device 208 using the third communication protocol. In one embodiment, the home identification code and/or node identification code provided by control device 202 is associated with the reference code assigned to remote network device 208 by bridge 204 at block 538. For example, if control device 202 assigned a node identification code of "24" to bridge 204 after receiving the registration information message from bridge 204 at block 532, bridge 204 stores the node identification code ("24") in memory 302 in association with the reference code that bridge 204 assigned to remote network device 208 at block 528 ("2"). Then, when a subsequent message is received by bridge 204 from control device 202, addressed to node 24 (i.e., remote network device 208), bridge 204 looks up a record in memory 302 associated with node identification code 24 and determines from the record that node identification code 24 corresponds to remote network device 208, identified in the record as reference code "2". Bridge 204 then re-transmits the message using the third communication protocol, addressing remote network device 208 using reference code "2".

In another embodiment, where a reference code is not used, the home identification code and/or node identification code received at block 524 is associated with remote network device 208 by storing the home identification code and/or node identification code in the record associated with remote network device 208. Then, when a subsequent message is received by bridge 204 from control device 202, addressed to node 24 (i.e., remote network device 208), bridge 204 looks up a record in memory 302 associated with node identification code 24 and determines from the record that node identification code 24 corresponds to remote network device 208, identified in the record by information such as a serial number associated with remote network device 208. Bridge 204 then re-transmits the message from control device 202 using the third communication protocol, addressing remote network device 206 using the serial number associated in the record with node 24.

At block 540, bridge 204 may reset the home identification code and/or node identification code of bridge 204. In some embodiments, the home identification code and/or node identification code received by bridge 204 at block 534 is stored in memory 302 and, either additionally or alternatively, associated with bridge 204, in accordance with one or more communication protocols in use today. Thus, at block 540, bridge 204 may reset the home identification code and/or node identification code associated with bridge 204 by, in one embodiment, erasing the home identification code and/or node identification code in memory 302. In another embodiment, a default home identification code and/or node identification code replaces the home identification code and/or node identification code in memory 302 that was previously associated with bridge 204. In yet another embodiment, the home identification code and/or node identification code remains stored in memory, but is dis-associated with bridge 204. In other words, while the home identification code and/or node identification code remains stored in memory (and associated with remote network device 208), bridge 204 ignores this information and does not include the home identification code and/or node identification code in subsequent transmissions.

The methods or algorithms described in connection with the embodiments disclosed herein may be embodied directly in hardware or embodied in processor-readable instructions executed by a processor. The processor-readable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components.

Accordingly, an embodiment of the invention may comprise a non-transitory processor-readable media embodying code or processor-readable instructions to implement the teachings, methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A system, comprising:
    a remote network device located at a home location which communicates using a first communication protocol;
    a control device located at the home location which communicates using a second communication protocol different than the first communication protocol; and
    a bridge device located at the home location for enabling communication between the remote network device and the control device, the bridge device comprising:
        a first transceiver for communicating with the remote network device using the first communication protocol;
        a second transceiver for communicating with the control device using the second communication protocol;
        a processor for executing processor-executable instructions; and a memory for storing the processor-executable instructions, the processor-executable instructions causing the bridge to:
    receive from the remote network device using the first communication protocol a first message, the first message comprising identification information and data indicative of a state of the remote network device;
    use the identification information within the first message to determine an identification code, wherein the identification code was provided by the control device in a second message transmitted using the second communication protocol prior to the first message being received from the remote network device and wherein the identification code was assigned by the control device for use in uniquely identifying the remote network device; and
    transmit to the control device using the second communication protocol a third message, the third message comprising at least the data indicative of a state of the remote network device received in the first message and the determined identification code.

2. The system as recited in claim 1, wherein the remote network device comprises a sensor device.

3. The system as recited in claim 2, wherein the sensor device comprises a tilt sensor.

4. The system as recited in claim 2, wherein the sensor device comprises a passive infrared sensor.

5. The system as recited in claim 2, wherein the sensor device comprises a motion sensor.

6. The system as recited in claim 1, wherein the remote network device comprises a camera.

7. A bridge device located at a home location for enabling communication between a remote network device located at the home location and a control device located at the home location, wherein the remote network device communicates using a first communication protocol and the control device communicates using a second communication protocol, the bridge device comprising:
    a first transceiver for communicating with the remote network device using the first communication protocol;
    a second transceiver for communicating with the control device using the second communication protocol;
    a processor for executing processor-executable instructions; and
    a memory for storing the processor-executable instructions, the processor-executable instructions causing the bridge device to:
    receive from the remote network device using the first communication protocol a first message, the first message comprising identification information and data indicative of a state of the remote network device;
    use the identification information within the first message to determine an identification code, wherein the identification code was provided by the control device in a second message transmitted using the second communication protocol prior to the first message being received from the remote network device and wherein the identification code was assigned by the control device for use in uniquely identifying the remote network device; and
    transmit to the control device using the second communication protocol a third message, the third message comprising at least the data indicative of a state of the remote network device received in the first message and the determined identification code.

8. A method implemented by a bridge device located at a home location for enabling communication between a remote network device located at the home location to a control device located at the home location, wherein the remote network device communicates using a first communication protocol and the control device communicates using a second communication protocol, the method comprising:
    receiving from the remote network device, located at the home location, the first message comprising identification information and data indicative of a state of the remote network device, the first message using the first communication protocol;
    using the identification information within the first message to determine an identification code, wherein the identification code was provided by the control device in a second message transmitted using the second communication protocol prior to the first message being received from the remote network device and wherein the identification code was assigned by the control device for use in uniquely identifying the remote network device; and
    transmitting to the control device, located at the home location, the third message comprising at least the data indicative of a state of the remote network device received in the first message and the determined identification code, the third message using the second communication protocol.

* * * * *